United States Patent
Alhazmy

(10) Patent No.: US 11,098,930 B2
(45) Date of Patent: *Aug. 24, 2021

(54) STIRLING CYCLE BASED SOLAR ENERGY POWERED DUPLEX COOLER

(71) Applicant: King Abdulaziz University, Jeddah (SA)

(72) Inventor: Majed Moalla Alhazmy, Jeddah (SA)

(73) Assignee: King Abdulaziz University, Jeddah (SA)

(*) Notice: Subject to any disclaimer, the term of this patent is extended or adjusted under 35 U.S.C. 154(b) by 0 days.

This patent is subject to a terminal disclaimer.

(21) Appl. No.: 17/192,526

(22) Filed: Mar. 4, 2021

(65) Prior Publication Data

US 2021/0190388 A1    Jun. 24, 2021

Related U.S. Application Data

(63) Continuation of application No. 16/510,161, filed on Jul. 12, 2019.

(51) Int. Cl.
*F25B 9/14* (2006.01)
*F03G 6/06* (2006.01)
(Continued)

(52) U.S. Cl.
CPC ............. *F25B 9/14* (2013.01); *F02G 1/043* (2013.01); *F03G 6/068* (2013.01); *F24S 20/30* (2018.05); *F24S 60/00* (2018.05)

(58) Field of Classification Search
CPC .. F02G 1/043; F02G 2243/02; F02G 2243/04; F02G 2280/10; F05C 2225/08; F02C 2225/08

See application file for complete search history.

(56) References Cited

U.S. PATENT DOCUMENTS 3,698,182 A * 10/1972 Knoos .................... F02G 1/044
60/522
3,767,325 A    10/1973 Schuman
(Continued)

FOREIGN PATENT DOCUMENTS

CN    201582065 U    9/2010

OTHER PUBLICATIONS

Stirling Engine ; Regenerators What They Are and How They Work ; https://www.stirlingengine.com/regenrators/ ; 14 Pages.

(Continued)

*Primary Examiner* — Shafiq Mian
(74) *Attorney, Agent, or Firm* — Oblon, McClelland, Maier & Neustadt, L.L.P.

(57) ABSTRACT

A solar energy powered Stirling duplex cooler is presented which includes a Stirling engine and a Stirling cooler. The Stirling engine drives the Stirling cooler to produce cold temperatures for refrigeration or air conditioning. The Stirling duplex cooler includes a solar concentrator to focus high temperature solar radiation upon the Stirling engine expansion space. The Stirling duplex cooler further includes a thermal storage tank to receive and store heat rejected from the cooler expansion space. This stored heat is used to operate the cooler at night. A flywheel connected operatively to engine and cooler expansion space pistons and a crankshaft connected operatively to engine and cooler compression space pistons actuate the pistons to move a working fluid between the expansion and compression spaces.

10 Claims, 9 Drawing Sheets

(51) Int. Cl.
*F24S 60/00* (2018.01)
*F24S 20/30* (2018.01)
*F02G 1/043* (2006.01)

(56) References Cited

U.S. PATENT DOCUMENTS

| | | | | |
|---|---|---|---|---|
| 3,956,894 | A * | 5/1976 | Tibbs | F02G 1/02 |
| | | | | 60/508 |
| 4,199,945 | A * | 4/1980 | Finkelstein | F02G 1/0435 |
| | | | | 60/520 |
| 4,455,826 | A | 6/1984 | Knoos | |
| 5,467,600 | A * | 11/1995 | Kuroiwa | F02G 1/04 |
| | | | | 417/399 |
| 8,640,454 | B1 * | 2/2014 | Nord | F02G 1/055 |
| | | | | 60/520 |
| 9,091,490 | B2 * | 7/2015 | Weinstein | F28D 15/06 |
| 9,624,913 | B2 | 4/2017 | Friesth | |
| 2009/0165461 | A1 | 7/2009 | Klassen | |
| 2010/0162702 | A1 * | 7/2010 | Bennett | B64C 39/024 |
| | | | | 60/659 |
| 2013/0284226 | A1 | 10/2013 | Ittner | |
| 2017/0030294 | A1 * | 2/2017 | Klassen | F02G 1/0435 |
| 2018/0119638 | A1 | 5/2018 | Kleinwachter | |

OTHER PUBLICATIONS

Church, et al. ; Stirling Engine Fabrication and Design ; WPI ; 69 Pages.

\* cited by examiner

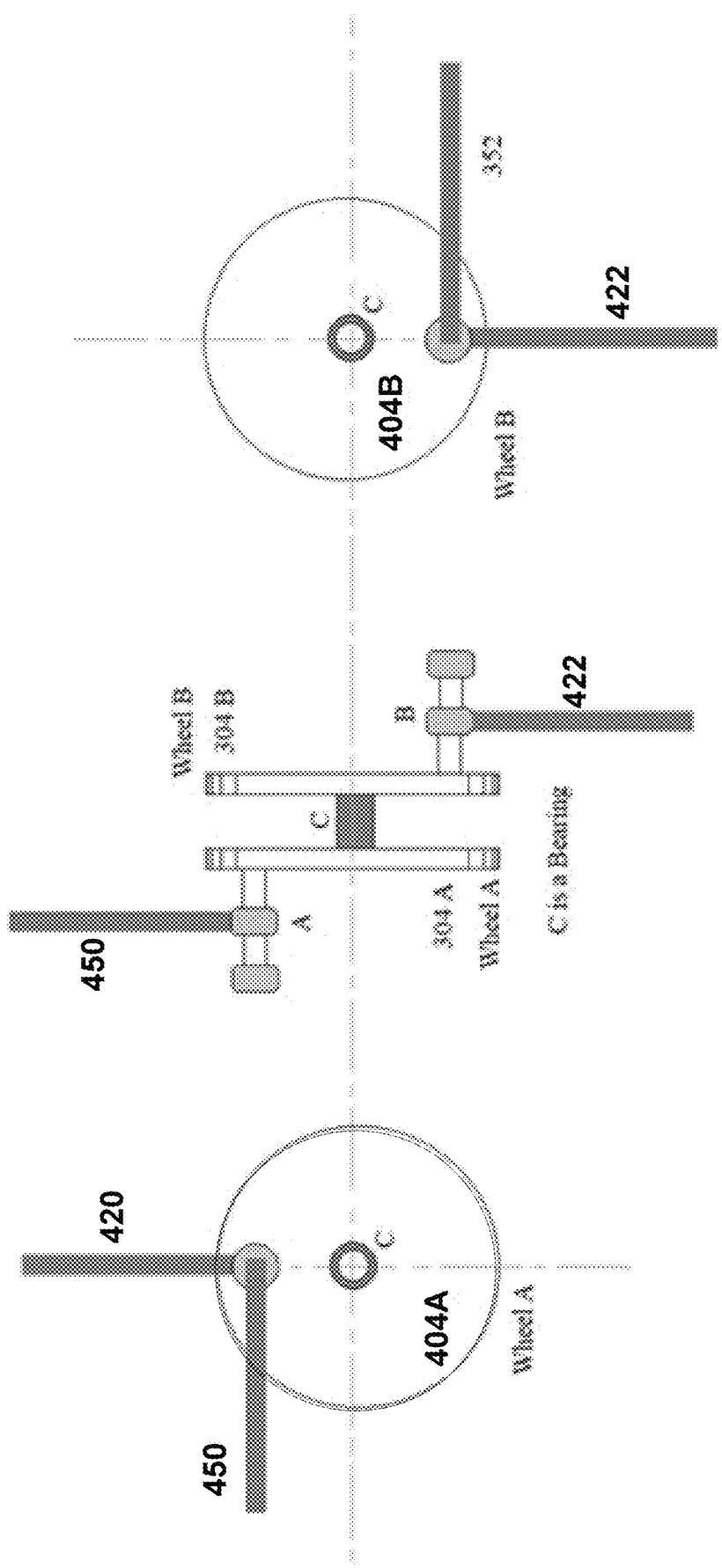

STIRLING CYCLE BASED SOLAR ENERGY POWERED DUPLEX COOLER

CROSS-REFERENCE TO RELATED APPLICATION

The present application is a continuation of U.S. application Ser. No. 16/510,161, allowed, having a filing date of Jul. 12, 2019, the entire contents of which are incorporated by reference herein in their entirety.

BACKGROUND

Technical Field

The present disclosure is directed to a solar energy powered Stirling duplex cooler integrated with a solar concentrator and thermal storage tank. This system utilizes solar power to drive a Stirling engine which then drives a Stirling cooler.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

One type of thermal machine capable of providing space heating and cooling, which can use non-polluting gases such as helium or hydrogen, is the Stirling cycle machine. The Stirling cycle is a closed reversible thermodynamic cycle which can be implemented as a prime mover when heat is supplied. The output is in the form of mechanical power, as for a refrigerator where mechanical power is supplied and the output is cooling capacity, as for a heat pump in which mechanical power is supplied and the output is in the form of heat (or in a reverse mode, cooling capacity).

The Stirling duplex machine is a Stirling cycle cooler driven by a Stirling cycle engine. See W Beale, "Free-Piston Stirling Engines—some model Tests and Simulations", International Automotive Engineering Congress, Detroit Mich., paper No 690230, Jan. 13-17, 1969; and B. Penswick and I Urieli, "Duplex Stirling Machines" Proceedings of the 19th annual Intersociety Energy Conversion Engineering Conference, San Francisco Calif. paper No QP 051082-A, August 1984, each incorporated herein by reference in their entirety). A conventional Stirling machine (whether an engine or a cooler) has two chambers connected by a regenerative heat exchanger. (See G. Walker, J. R. Senft "Free Piston Stirling Engines", Lecture Notes in Engineering Edited by C. A. Brebbia and S. A. Orszag, Springer-Verlag, New York, 1985; and Alhazmy, M. and Peterson, R. B. "A simple computational model for alpha free-pistons Stirling cooler", Proceedings of the 33rd IECEC, Colorado Springs, Co, Aug. 2-6, 1998, Paper No. IECEC-98-282, each incorporated herein by reference in their entirety). Each working space comprises a piston trapping a working fluid in a cylinder. Each working space is maintained at a fixed temperature by exchanging heat with the surroundings. The working fluid is either compressed or allowed to expand in each working space. The working fluid is displaced continuously between the two spaces by the pistons. Pistons of the working spaces are joined to one main flywheel by connecting rods/crankshafts mechanism. The working fluid passing through the regenerator gives up the heat to the regenerator and then takes it back as it moves between the two spaces. (See G Walker, "Cryocoolers: part 1 Fundamentals", The International Cryogenics Monograph series, New York, 1983; William Beale, "Stirling Engines for Developing Countries" in Understanding Stirling Engines William Beale, Arlington, Va. USA; and U.S. Pat. No. 7,171,811 B1, each incorporated herein by reference in their entirety).

Stirling duplex machines having integrated engine/cooler systems have been previously described. (See DE19953512C1; U.S. Pat. No. 4,996,841; "Regenerator and the Stirling Engine", by Allan J. Organ, (Wiley; 1 edition, Mar. 14, 1997, 624 pages); and U.S. Pat. No. 4,462,212, each incorporated herein by reference in their entirety).

The present disclosure describes a duplex Stirling cycle machine that consists of a solar energy powered Stirling engine and a Stirling cooler. The solar energy powered engine is used to provide the power needed to operate the Stirling cooler. Two additional components are a solar concentrator and a thermal storage tank. The solar concentrator helps to maximize the power and the storage tank is used to provide a temperature differential which operates the cooler at night.

SUMMARY

In an exemplary embodiment, a Stirling duplex cooler is described. The Stirling duplex cooler comprises a Stirling engine having an engine expansion space and an engine compression space, a solar concentrator configured to direct solar heat to the engine expansion space, a Stirling cooler having a cooler expansion space and a cooler compression space, and a thermal storage tank operatively connected to draw heat from the cooler expansion space. The Stirling engine is operatively connected to the Stirling cooler to drive the Stirling cooler. A first regenerator is connected by first tubing between the engine expansion space the engine compression space, and second regenerator is connected by second tubing between the cooler expansion space and the cooler compression space. Each expansion space includes a cylinder and a piston, wherein each piston is operatively connected to rotate a flywheel. Each compression space includes a cylinder and a piston wherein each piston is operatively connected to the crankshaft for reciprocating motion.

The second exemplary embodiment describes a method for operating a Stirling duplex cooler which comprises expanding, by solar heating due to a solar concentrator, a first working fluid within a Stirling engine, driving a flywheel and a crankshaft operatively connected to the Stirling engine and a Stirling cooler. The method comprises cooling, by a thermal storage tank, a second working fluid within a Stirling cooler, and driving the Stirling cooler by the Stirling engine.

In another exemplary embodiment, method for operating a Stirling duplex cooler comprises directing solar energy, by a solar concentrator, onto a Stirling engine expansion surface containing a first working fluid; heating the first working fluid by the solar energy, wherein heating the first working fluid causes the first working fluid to expand and drive a first piston within a first cylinder of the engine expansion space in the direction away from the Stirling engine expansion surface; rotating, by the first piston, a flywheel connected to the first piston in a first direction, until the piston pushes the heated first working fluid through a first regenerator into an engine compression space; filling a second cylinder within the engine compression space with the first working fluid, wherein filling the second cylinder causes a second piston within the second cylinder to translate towards the flywheel and wherein translating the second piston towards the flywheel translates a crankshaft connected to a third piston of a third cylinder of a cooler compression space to push a second working fluid through a second regenerator into a cooler expansion space and moves a fourth piston through a fourth cylinder of the cooler expansion space towards the flywheel, wherein moving the fourth piston towards the flywheel moves the flywheel in the first direction.

The third embodiment includes cooling the second working fluid first, by movement of the second working fluid through the second regenenerator, and secondly, by immersing a heat sink connected the fourth cylinder in a thermal storage tank filled with a water-glycol mixture.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 4C depicts a facing view of flywheel A, according to certain embodiments.

FIG. 4D depicts the crankshafts, piston rods and dual flywheel inner crank connections in a side view, according to certain embodiments.

FIG. 4E depicts a facing view of flywheel B, according to certain embodiments.

DETAILED DESCRIPTION

Figure 1:
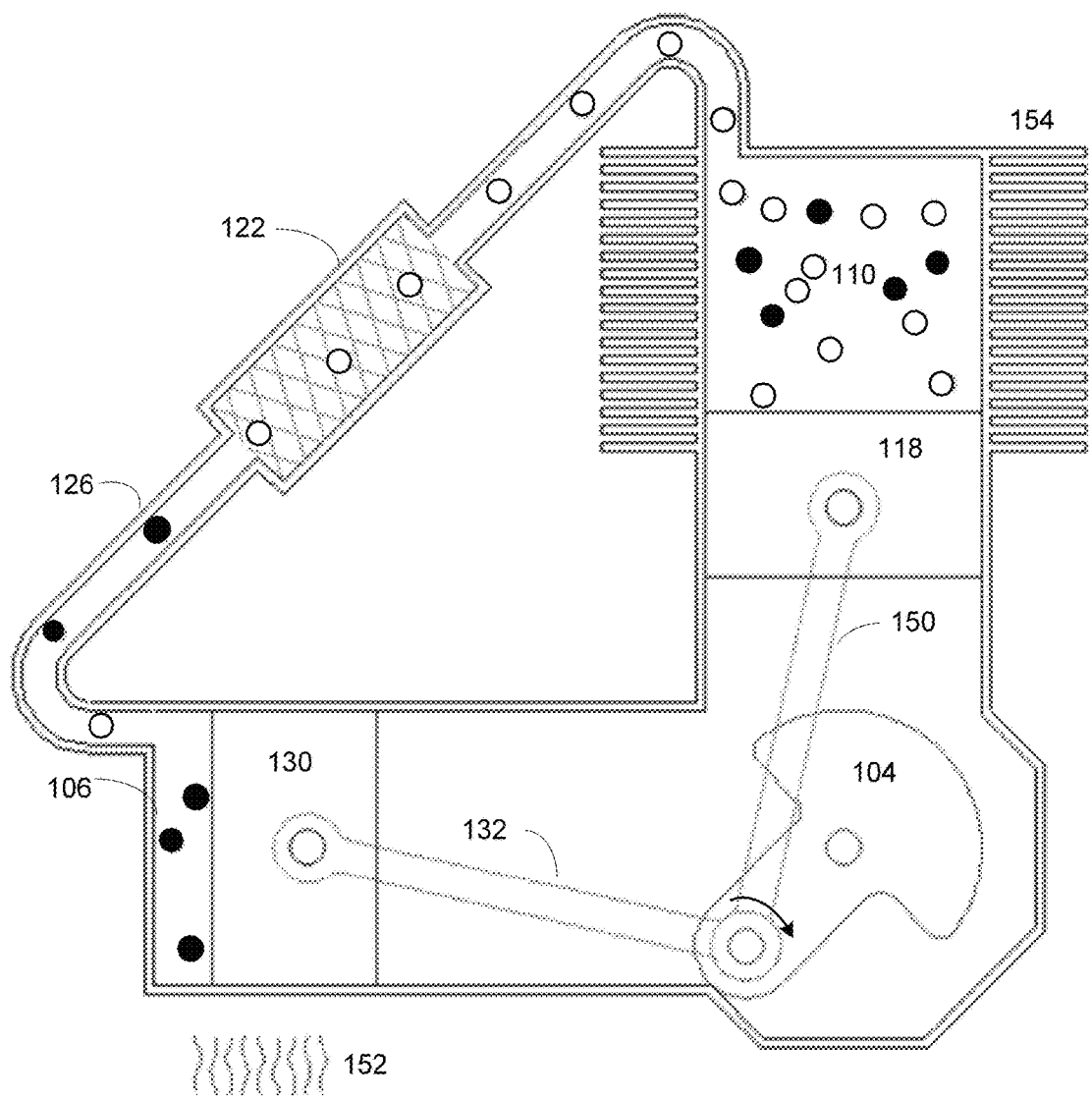
FIG. 1 illustrates a schematic of a heat powered single Stirling machine, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a Stirling duplex cooler and methods for operating a Stirling duplex cooler.

A conventional Stirling machine is a closed, reversible, thermodynamic cycle which can be implemented as a prime mover or as a cooler. For engines, heat is supplied to the cycle to produce mechanical power, while for coolers, mechanical power is supplied and the output is cooling capacity.

The ideal Stirling cycle includes the following three thermodynamic processes acting on the working fluid; 1) Isothermal Expansion—the expansion-space and associated heat exchanger are maintained at a constant high thermal temperature and the gas undergoes near-isothermal expansion absorbing heat from the hot source; 2) Constant-Volume (known as isovolumetric or isochoric) heat-removal, in which the gas is passed through the regenerator, where it cools, transferring thermal energy to the regenerator for use in the next cycle; and 3) Isothermal Compression—the compression space and associated heat exchanger are maintained at a constant low thermal temperature so the gas undergoes near-isothermal compression rejecting heat to the cold sink. The theoretical thermal efficiency equals that of the hypothetical Carnot cycle, i.e. the highest efficiency attainable by any heat engine.

FIG. 1 is a depiction of a conventional single Stirling engine, showing connections of an expansion space piston 130 to a flywheel 104, an engine compression space piston 118 to the flywheel and tubing 126 connecting a regenerator 122 to cylinders 106 and 110. A heat source 152 heats gas (hot gas shown as black dots) in the cylinder 106. In this example, the majority of the hot gas in cylinder 106 has transferred to the compression space cylinder 110. The heat of the hot gas has been captured in the regenerator 122. The cooled gas particles (shown as white circles) have radiated their remaining heat to the cooler surroundings through heat sink 154. As the gas cools, it contracts, pulling piston 118 to close the compression space of cylinder 110. The flywheel 104 rotates in a clockwise direction, drawing the piston 130 to open the cylinder 106. This action forces the cooled gas particles back through the regenerator 122, where they are warmed by the stored heat, and into the cylinder 106. The regenerator thus acts as a pre-heater, reducing the amount of heat which must be applied to expand the gas particles as they move into cylinder 106. The gas particles transfer back and forth between cylinder 106 and cylinder 110 turning the flywheel. The rotation of the flywheel can be used to drive a further mechanical device, such as an engine, or to drive an electrical generator.

A Stirling machine needs a temperature differential to operate. In the example of FIG. 1, heat was supplied by a heater 152. However, Stirling machines can operate by temperature differentials such as a cold source, such as ice, at the compression space cylinder and room temperature at the expansion space cylinder. Stirling engines have been shown to operate at temperature differentials of one degree Celsius.

In the example of FIG. 1, a non-specified heat source 152 was shown.

Figure 2A:
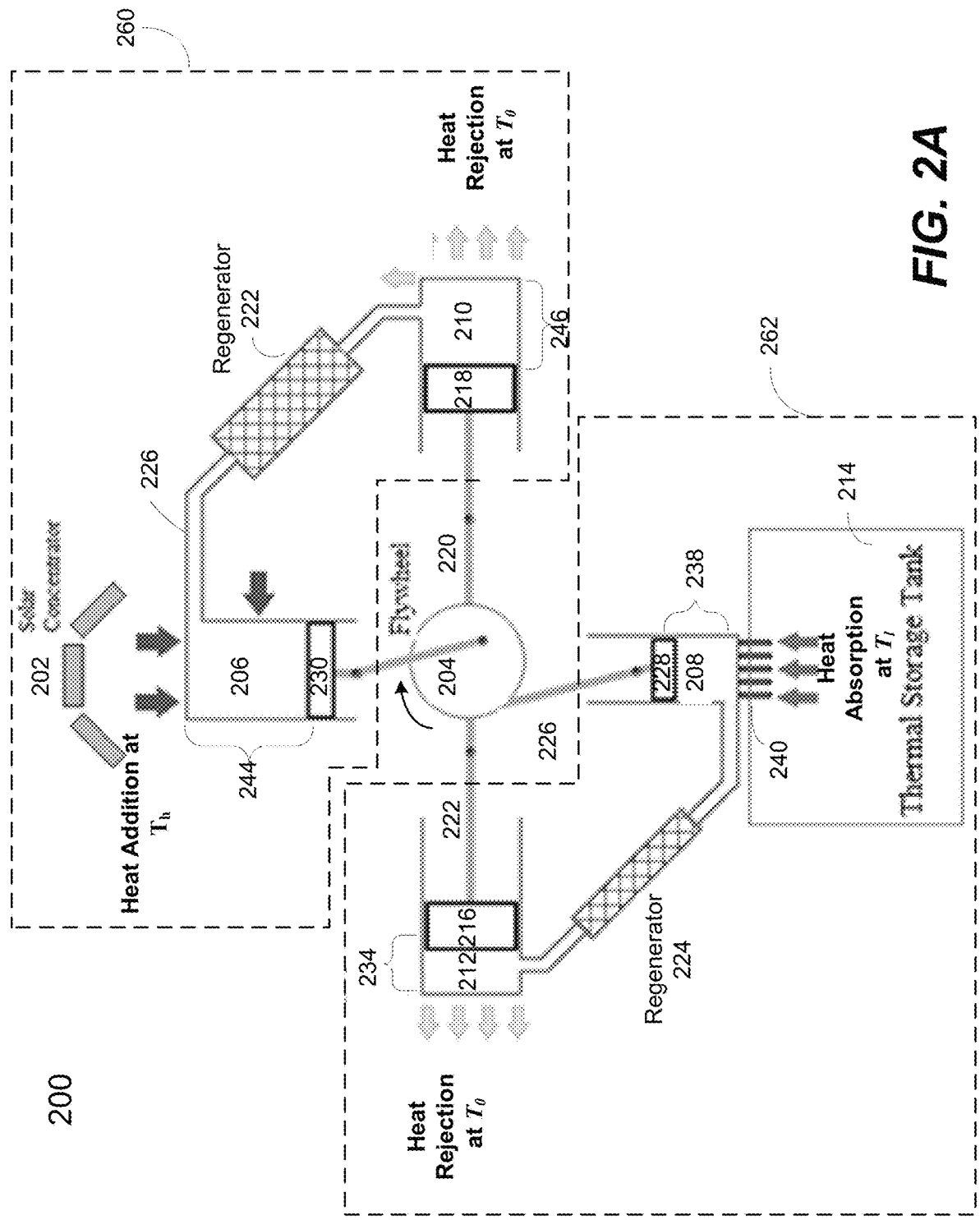
FIG. 2A is an illustration of the Stirling duplex cooler, according to certain embodiments.

The present disclosure describes a duplex Stirling cycle machine that comprises two Stirling machines: a solar energy powered Stirling engine 260 and a Stirling cooler 262 as shown in FIG. 2A.

In an aspect, the solar energy powered Stirling duplex machine is integrated with a thermal storage tank 214 and a solar concentrator 202. This system utilizes solar power to drive the Stirling engine 260 which then drives the Stirling cooler 262.

The Stirling engine receives heat at its high temperature side, produces work to drive the cooler and rejects heat to the surroundings at an intermediate temperature. The cooler uses the work generated by the engine both to absorb heat at low temperature from the thermal storage tank and reject heat to the surroundings and into the thermal storage tank.

The system, as shown in FIG. 1, consists of three integrated units:

1) A Stirling duplex (i.e. a Stirling cooler driven by a Stirling engine)
2) A solar concentrator.
3) Thermal storage tank.

The solar energy powered engine is used to provide the mechanical power needed to operate the Stirling cooler. The solar concentrators help to maximize the applied solar power and the thermal storage tank is used to provide the temperature differential needed to warm the gas and also to operate the cooler at night time.

A solar concentrator uses lenses, called Fresnel lenses, which direct sunlight towards a specific spot by bending the rays of light and focusing them. Solar concentrators can be characterized by reflective concentrators such as parabolic reflectors and compound parabolic concentrator reflectors and also by refractive concentrators such as Fresnel lenses and convex lenses. The forms of concentration include linear concentration such as provided by trough parabolic concentrators, and point concentration such as provided by disk parabolic concentrators.

Figure 2B:
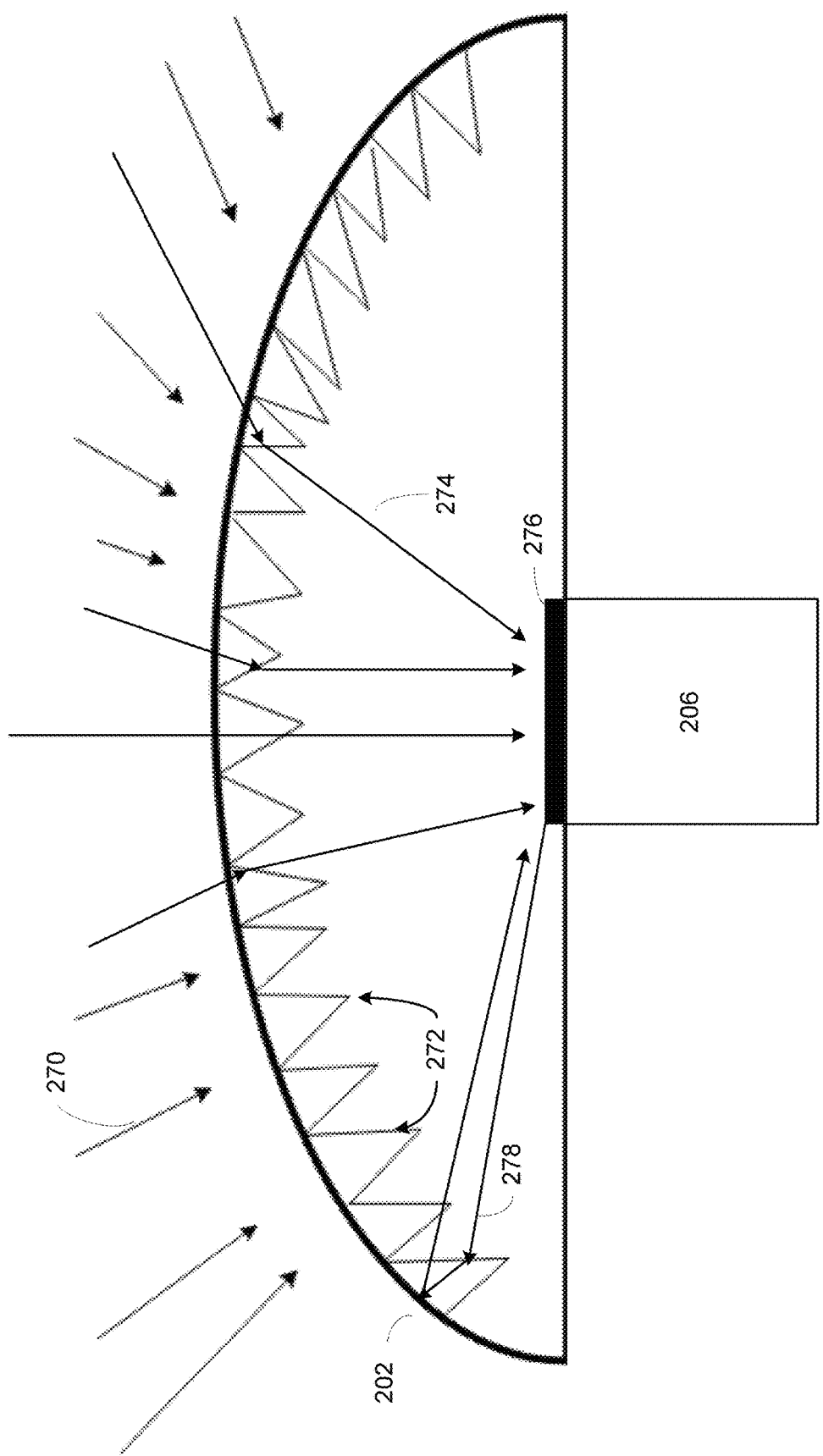
FIG. 2B is an illustration of a solar concentrator, according to certain embodiments.

The solar concentrator of the present disclosure is preferably a parabolic reflector with a Fresnel surface as shown in FIG. 2B. The parabolic reflector 202 includes a plurality of Fresnel focusing facets 272. The focus of each facet is directed towards a heating area 276 of the expansion space 244 of the Stirling engine, in this case cylinder 206. The arrangement of Fresnel focusing plates compensates for the position of the sunlight 270 impinging on the concentrator. Regardless of the sun's position in the daytime, a section of the Fresnel focusing plates will direct sunlight to heat the expansion area, as shown by the focused rays 274. Further, light which would otherwise be lost when it reflects from the heat receiving surface (usually, a cylinder end) of the expansion space is totally internally reflected by the Fresnel facets back to the heat receiving surface as shown by ray 278. This focused light heats the heating area 276 of the cylinder 206 to drive the Stirling engine 260. The cylinder 206 end may be coated with a black paint 276 in order to absorb the radiation without reflection.

Alternatively, the solar concentrator may be flat, segmented, hemispherical, or any other type of solar concentrator capable of focusing solar energy upon the expansion area of the Stirling engine.

The solar concentrator 202 focuses the solar radiation on the hot side of the engine (cylinder 206) and heats up the working fluid in the expansion space of the engine. Fluid at high temperature and high pressure conditions then moves through the regenerator 222 to the compression space of the engine. The working fluid expands and expels heat from the cylinder 210 to the surroundings at $T_0$. The net positive mechanical power produced during this process drives the cooler.

The integrated Stirling machine exchanges heat at three different temperatures. The solar concentrator 202 directs concentrated solar energy at a high temperature, $T_h$, onto the surface of the engine expansion space of cylinder 206. The system rejects heat to the nearby surroundings at an intermediate temperature, $T_0$, in both the engine compression space and in the (Stirling) cooler compression space 234. Heat is also absorbed from the thermal storage tank to keep the tank at a low temperature, $T_1$, in the (Stirling) cooler expansion space 238 and to provide a higher temperature differential between the (Stirling) cooler compression space 234 and the (Stirling) cooler expansion space 238.

Each Stirling machine, whether heat engine or cooler, has two working spaces. The hot side of the engine is maintained at high temperature by the solar concentrator and the cold side of the engine is exposed to the surroundings. The cold side of the cooler is attached to a storage tank and the hot side of the cooler is exposed to the surroundings. The temperature of the surroundings is lower than the hot side of the engine and higher than the cold side of the cooler.

The system has two separate working fluid circuits, one for the engine and another for the cooler. In an engine cycle, the working fluid transitions between the high-temperature $T_h$ maintained by the solar collector and the intermediate temperature $T_0$ of the surroundings. For the cooler, the working fluid operates between the intermediate temperature, $T_0$, of the surroundings and the lowest temperature of the storage tank at $T_1$. The fluid circulating inside the engine cycle may be of a different type or at a different average operational pressure than that running in the cooler.

As the two Stirling engines are connected through the operation of the flywheel and crankshaft, the integrated engine/cooler system exchanges heat with three different thermal zones simultaneously. The three thermal zones are high-temperature zone at $T_h$ maintained by the solar energy concentrator 202, intermediate-temperature surroundings at $T_0$ and a low-temperature zone $T_1$ of the thermal storage tank 214. At steady state, the integrated engine/cooler system produces power to drive the cooler and provides cooling simultaneously. Therefore, no net power is produced by the system.

In order to for the solar energy powered Stirling engine to drive the cooler, the pistons 218 and 216 are connected to a crankshaft 220 for reciprocating motion. Pistons 230 and 228 are connected to the flywheel 204 and drive the crankshaft 220.

To operate as an engine, a Stirling engine needs to absorb heat, expand the gas, reject waste heat, and then compress or contract the gas. A main component of a Stirling engine is a regenerator, which is placed between a hot and lower temperature spaces.

A regenerator works by storing some of the heat that would otherwise have to be rejected to the environment in the regenerator until the working gas flow reverses and the heat can be used in the next cycle. The regenerator in a Stirling engine works as an internal heat exchanger, located between the hot and cold parts of the engine. The working fluid flows over it in both directions, storing heat from one cycle to be used in the next cycle. A regenerator is used to recycle the heat within the engine, as opposed to wasting the heat to the atmosphere. This improves overall efficiency and power output.

The regenerator transfers heat between a working fluid and a flow-channel wall of the regenerator. The fluid can be helium or another gas that has suitable thermodynamic properties and that does not react chemically with engine components. A typical regenerator is cylindrical in overall shape and includes one or more axial passages containing a matrix, which is an open, thermally conductive structure with many flow paths and large surface area for transfer of heat to and from the working fluid. The regenerator has an insulated wall which enables heat storage in the matrix. During the passage of hot particles, heat is transferred from the hot fluid and is stored in the matrix of the regenerator. In the return path, this heat is regenerated and is transferred to the cold fluid passing through the regenerator.

Figure 2C:
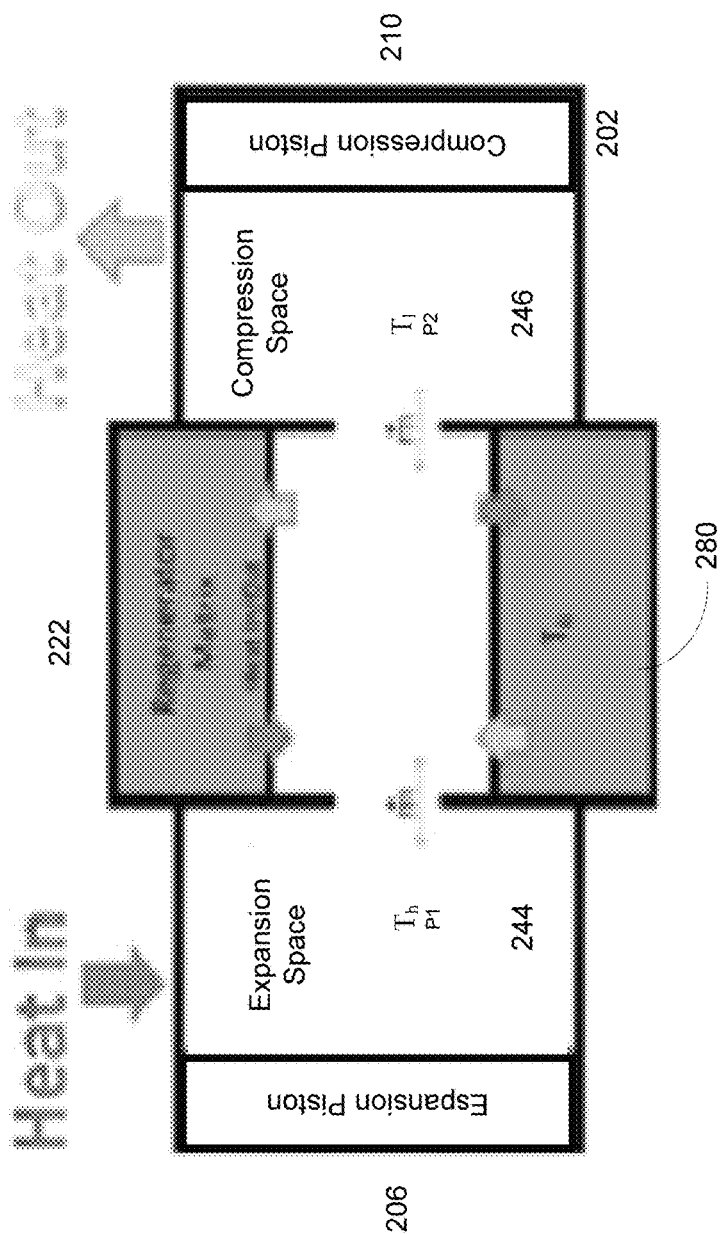
FIG. 2C is an illustration of a regenerator, according to certain embodiments.

There are many types of regenerators available. All regenerators used in the present disclosure have low thermal conductance in the lateral (axial) direction and high thermal conductance in the traverse (radial) direction. Matrices in regenerators can be made of various components, including steel wool, steel felt, stacked screens, packed balls, metal foils, metallic meshes, metallic sponges, carbon fibers, perforated pyrolytic graphite stacks, open pore metal foams and parallel plates, and combinations of the foregoing. The matrix materials may be any of stainless steel, copper, bronze, aluminum and Monel 400, and combinations of the foregoing. In a non-limiting example, a regenerator (222, 224) used in the present disclosure may be a stainless steel cylinder lined with steel wool. In a further non-limiting example, a regenerator may be constructed of a mesh of closely spaced, thin metal plates. A regenerator 280 is shown in FIG. 2C. (See "Stirling Engine Regenerators —Explained—Regenerators—What They Are and How They Work", American Stirling Company, https://www.stirlingengine.com/regenerators/, incorporated herein by reference in its entirety). Heated particles at temperature $T_h$ in Expansion Space 244 enter into the regenerator 280 and give up heat. These particles further give up heat in compression space 246 with the aid of a heat sink, until they are at temperature $T_1$. On the return path, the particles are warmed or pre-heated due to the stored heat in the regenerator.

Figure 4A:
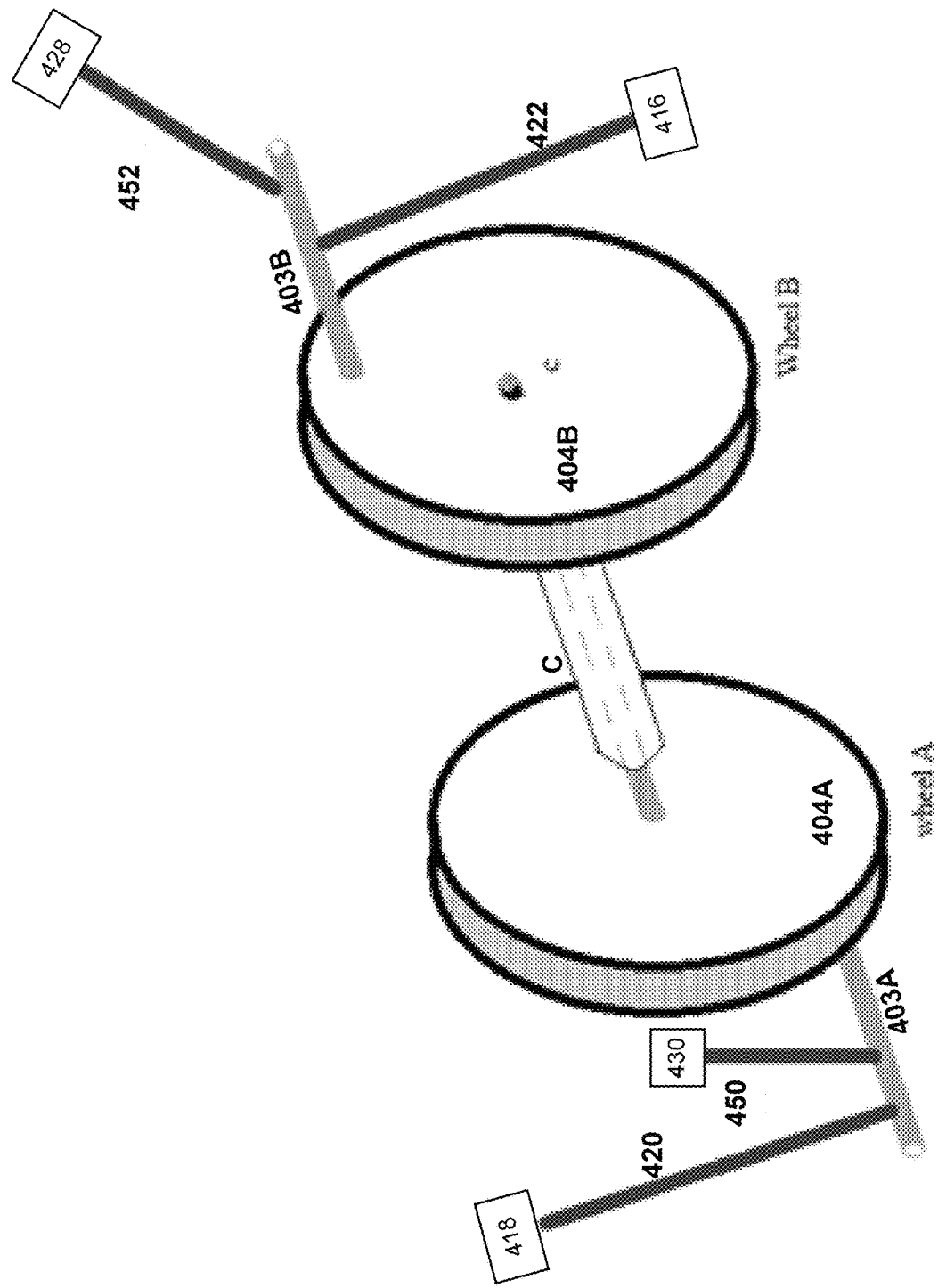
FIG. 4A depicts the crankshafts, piston rods and dual flywheel outer crank connections in an expanded view, according to certain embodiments.
Figure 4B:
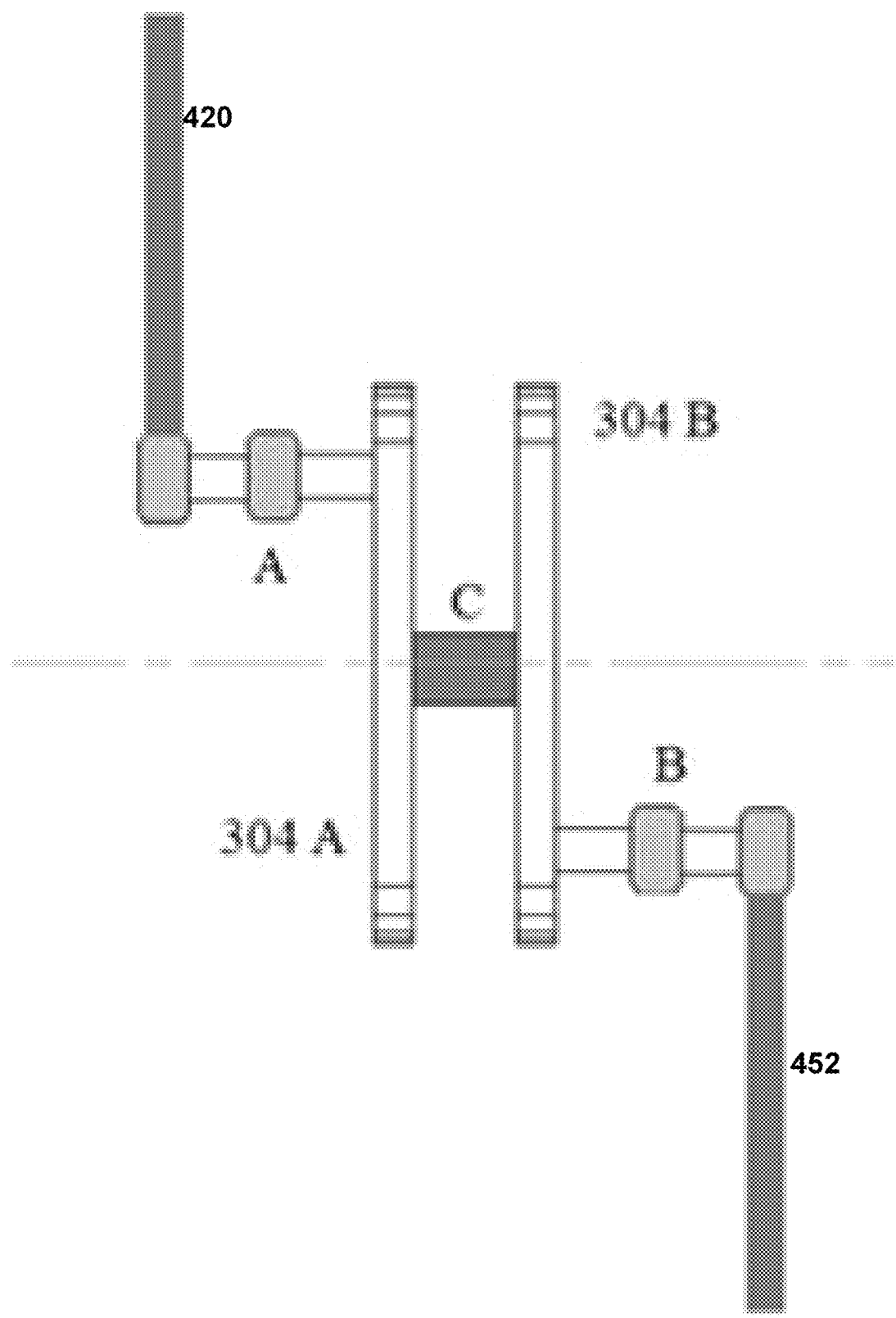
FIG. 4B depicts the crankshafts, piston rods and dual flywheel connections in a side view, according to certain embodiments.

As shown in FIG. 2A, 4A, the Stirling duplex cooler comprises four pistons (216, 218, 228, 230) each attached by a connecting rod to a piston operatively connected to a flywheel. As shown in FIG. 4A, the flywheel includes a first flywheel 404A and a second flywheel 404B. Each piston moves within a respective cylinder (212, 210, 208, 206). Each cylinder is connected to one of two regenerators (222, 224).

Pistons (216, 218) of a first Stirling engine are each operatively connected to either of crankshaft 220 or crankshaft 222, which are connected to one of the flywheels 204. The crankshafts are driven by the compression pistons 216, 218 as shown in FIG. 2A. Flywheel 204 is weighted (not shown) to balance the crankshaft/flywheel combination.

Figure 3A:
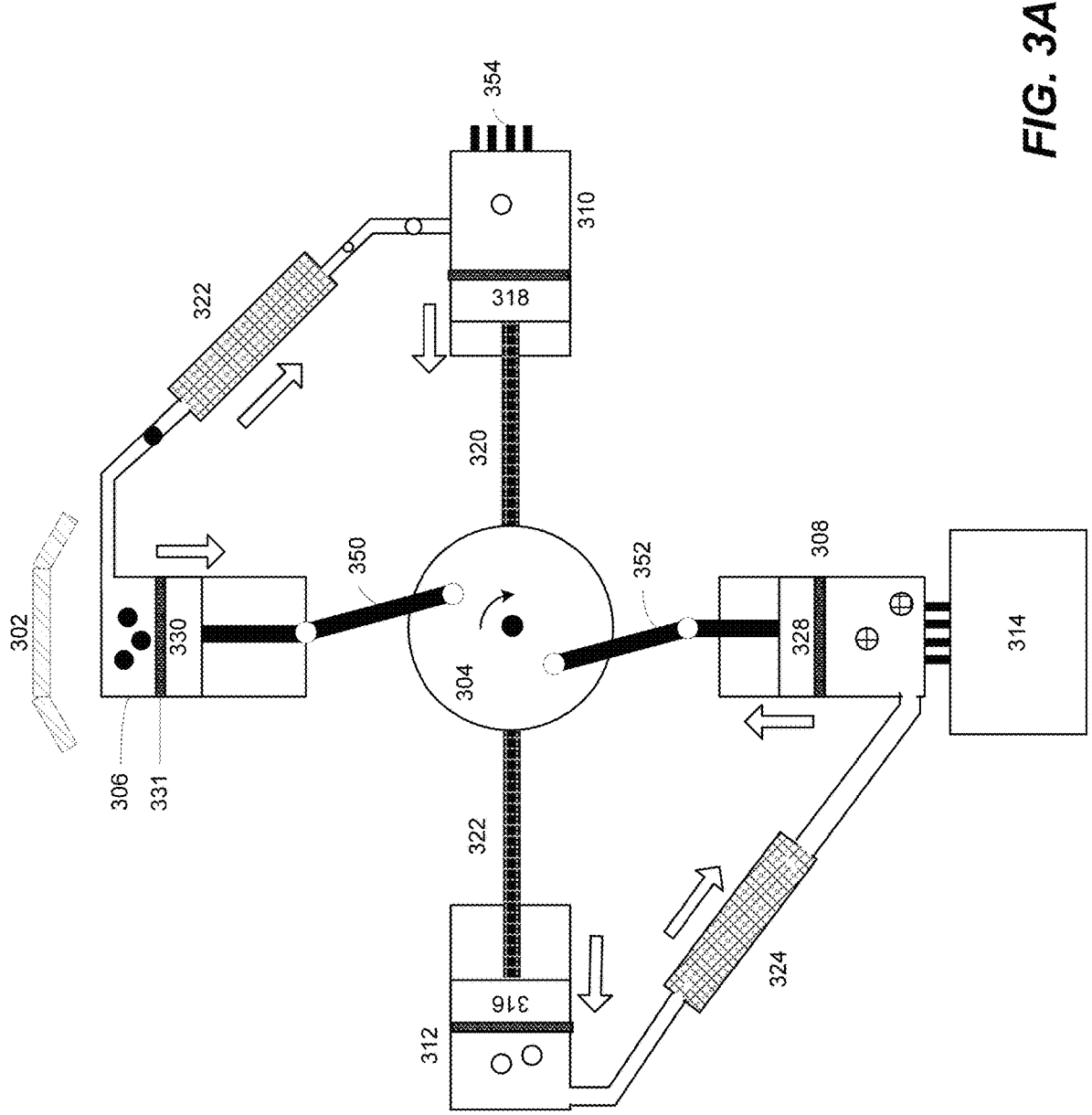
FIG. 3A is an exemplary illustration of a first cycle of the Stirling duplex cooler, according to certain embodiments.

An engine expansion space piston 230 and a cooler expansion space piston 228 are operatively connected to flywheel 204 to rotate the flywheel. Each expansion piston is connected by a wrist pin 284 to a piston rod 350, 352 as shown in FIG. 3A. The flywheel is rotated 360 degrees by the push-pull action of the piston rods.

Similarly, each compression space piston (216, 218) is connected to a crank 222, 220 respectively for reciprocal motion. The crankshafts are operated by the reciprocal motion of the pistons 216 and 218 in their cylinders. As piston 218 moves into cylinder 210, the crank pulls piston 216 out of cylinder 212 (towards the right, as shown in FIG. 2A). The crankshaft 220 alternately rotates 180 degrees in the clockwise direction then rotates 180 in the counterclockwise direction to push and pull the compression space pistons within their cylinders.

A first regenerator 222 connects the engine expansion space of cylinder 206 with an engine compression space of cylinder 210. A second regenerator 224 connects the cooler expansion space of cylinder 208 with the cooler compression space of cylinder 212. Heat sink 240 at the bottom of cylinder 208 protrudes into the reservoir of a thermal storage tank 214. Cool air is output at the cooler expansion space. Heat is absorbed from the thermal storage tank 315 as shown by arrows and enters the cooler expansion space.

The cylinders and pistons may be machined from any one of the group consisting of aluminum, copper, chrome, iron alloys, cobalt based superalloys, silicon carbide, and silicon nitride. Alloys of iron may be any one of nickel, chromium, cobalt, columbium, molybdenum and tungsten. The expansion and the compression spaces of the cylinders should be thermally conducting materials. It is known that both aluminum and copper have high coefficients of thermal conductivity. In a non-limiting example, the cylinders and pistons are made of copper. In another non-limiting example, the cylinders and pistons are made of aluminum. All contacting surfaces inside the cylinders and the outer surfaces of the pistons are highly polished to reduce drag.

In a non-limiting example, the crankshaft and flywheel are manufactured by forging or casting ductile iron aluminum or aluminum alloys or tool steel.

Each piston includes a piston ring. For example, piston ring 331 is shown on piston 330 in FIG. 3A. An inner portion of the cylinder 306 comprises a large bore in which the piston ring 331 rides. The pistons and cylinders are scaled with respect to the size of the Stirling duplex cooler. In a non-limiting example, a piston may have a height of one fourth the cylinder bore length.

The pistons and the cylinders forming the working spaces and the regenerators are the basic mechanical components of a Stirling cycle machine. The Stirling heat engine section and the Stirling cooler sections are each hermetically sealed so that no gas escapes.

The regenerator is constructed of material that readily conducts heat and has a high surface area. When hot gas is transferred to the cool cylinder, it is first driven through the regenerator, where a portion of the heat is deposited. When the cool gas is transferred back, this heat is reclaimed; thus the regenerator "pre heats" and "pre cools" the working gas, dramatically improving efficiency.

In a non-limiting example, helium gas may be the working fluid in the engine and the cooler. The working fluid circulating in the engine side may be of a different type or at a different average operational pressure than that running in the cooler side. The working fluid may selected from the group consisting of helium, hydrogen, air, ethanol, nitrogen, combinations of air and ethanol, fluorine compounds exemplified by sulfur hexafluoride, perfluorobutane, perfluoropropane, and octafluorocyclobutanenano-fluids; nano-fluids and combinations of air, ethanol and ZnO nanoparticles.

In a non-limiting example, a water-glycol solution may be used the thermal storage tank 214. The solution is preferably 40% water to 60% glycol. The thermal storage tank is insulated to retain the heat needed to drive the Stirling cooler. The low temperature, $T_1$, in the thermal storage tank is preferably in the range of 0 to 10 degrees C., more preferably 2 to 8 degrees C., even more preferably 3 to 5 degrees C., even more preferably about 4 degrees C.

Temperature $T_0$ is preferably in the range of 10 to 30 degrees C., more preferably 15 to 25 degrees C., even more preferably 18 to 23 degrees C., even more preferably about 23 degrees C. The high temperature, $T_h$, is preferably in the range of 60 to 180 degrees C., more preferably 80 to 150 degrees C., even more preferably about 120 degrees C. The amount of solar energy in the engine expansion space should be controlled such that $T_h$ is less than the boiling point of the working fluid. For example, the boiling point of helium is about 270 degrees C. and of hydrogen is about 253 degrees C.

A description of the operation of the Stirling duplex machine is given below.

The operation of the Stirling duplex machine is continuous, but is described with respect to two cycles of operation.

Cycle 1: As shown in FIG. 3A, cylinder 306 is filled with gas. Solar energy from the concentrator 302 heats the gas in cylinder 306. The gas expands, pushing piston rod 350 down from point B to point A, rotating flywheel 304 clockwise. The expanded hot gas (black circles) moves into regenerator 322, where it gives up its heat, entering cylinder 310. The cooled gas is represented by white circles. As the gas fills the cylinder 310, piston 318 moves towards the flywheel. The crankshaft 320, connected to piston 318, pushes piston 316 to the left through action of the flywheel, forcing gas at temperature $T_0$ (the ambient temperature) into regenerator 324. At the same time, rotation of the flywheel 304 pulls piston 328 upwards from point A to point B (see FIG. 3B), which creates a vacuum in the cooler expansion space, drawing gas in 312 at temperature $T_0$ through regenerator 324, and into cylinder 308. The gas in cylinder 308 further gives up heat due to heat sink 356 connected to thermal storage tank 314, until the gas is at temperature $T_1$. Cylinder 308 provides useful cooling for refrigeration, air conditioning or other purposes.

Figure 3B:
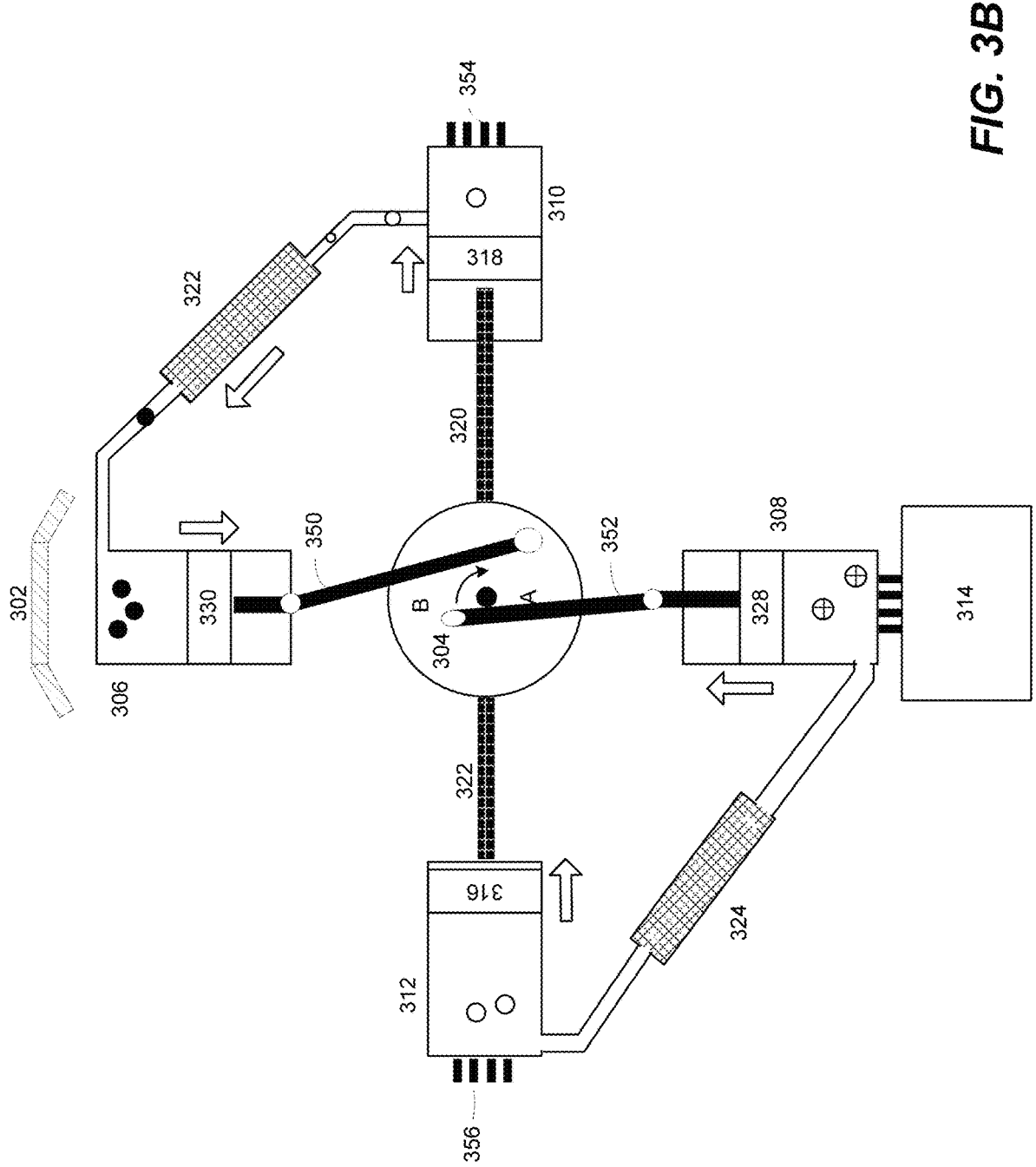
FIG. 3B is an exemplary illustration of a first cycle of the Stirling duplex cooler, according to certain embodiments.

Cycle 2: As shown in FIG. 3B, the gas in 310 cools to temperature $T_0$, and contracts, pulling piston 318 to the right. Momentum from the rotation of the flywheel pulls piston 330 down, creating a vacuum. Gas in 310 is drawn into the regenerator 322 where it picks up heat and reenters cylinder 306. Heating the gas by the solar concentrator 302 expands the gas, aiding in moving piston 330 down. Piston 316 moves to the right, creating a vacuum in cylinder 312 and drawing the cold gas at temperature $T_1$ from cylinder 308 into the regenerator 324. Momentum of the flywheel pushes piston 328 down, expelling gas at temperature $T_1$ into regenerator 324, where it picks up heat. Gas in cylinder 312 is at temperature $T_0$.

FIG. 4A to 4E show details of the flywheel. The flywheel 404 is a dual mass flywheel, having wheels 404A and 404B. The flywheels are connected by a shaft having a bearing C. Crankshaft 420 and piston rod 450 are both connected to crank 403A on flywheel 404A by respective bearings. Crankshaft 422 and piston rod 452 are both connected to crank 403B of flywheel 404B by respective bearings.

The first embodiment is drawn to a Stirling duplex cooler 200 as shown in FIG. 2A. The Stirling duplex cooler of the first embodiment comprises a Stirling engine 260 having an engine expansion space 244 and an engine compression space 246, a solar concentrator 202 configured to direct solar heat to the engine expansion space, a Stirling cooler 262 having a cooler expansion space 238 and a cooler compression space 234, and a thermal storage tank 262 operatively connected to draw heat from the cooler expansion space 238.

A first regenerator 222 is connected by first tubing 226 between cylinder 206 of the engine expansion space 244 and cylinder 210 of the engine compression space 246. A second regenerator 224 is connected by second tubing between a cylinder 212 of the cooler expansion space 234 and a cylinder 208 of the cooler compression space 238.

The Stirling duplex cooler includes at least one type of working fluid. The fluid is at least one of helium and hydrogen. Preferably, the working fluid in each of the first and second hermetically sealed working spaces is helium, however, the working fluid in the Stirling engine may be of a different type or at a different average operational pressure than the working fluid in the Stirling cooler.

The engine expansion space 244, the engine compression space 246, the first tubing 226 and the first regenerator 222 form a first hermetically sealed working space which contains a first working fluid. The cooler expansion space 238, the cooler compression space 234, the second tubing and the second regenerator 224 form a second hermetically sealed working space which contains a second working fluid. As noted above, the first and second working fluids may be the same or different.

The solar concentrator 202 directs a concentrated solar energy at a high temperature, $T_h$, on the surface of the engine expansion space of the Stirling duplex.

The thermal storage tank 214 absorbs heat from the cooler expansion space 238 to keep the cooler expansion space at a low temperature, $T_1$. The absorption of heat is aided by a heat sink 240 on an outer surface of the cooler expansion space (i.e., the cylinder 208). The heat sink is immersed in the thermal storage tank.

To further cool the first working fluid, an outer surface of the engine compression space 210 further comprises a heat sink (on the cylinder 210, see FIG. 3A).

The Stirling duplex cooler 200 further comprises at least one flywheel 204 and at least one crankshaft 220. Each expansion space (244, 238) includes a cylinder (206, 208) and a piston (230, 228), wherein each piston is operatively connected to rotate the flywheel 204. Each compression space (246, 234) includes a cylinder (210, 212) and a piston (218, 216), wherein each piston is operatively connected to the crankshaft 220, 222 for reciprocating motion.

The second embodiment describes a method for operating a Stirling duplex cooler as is shown in FIG. 2A, 3A, 3B, 4A-4E. The method comprises expanding, by solar heating, a first working fluid within a Stirling engine 260, wherein the expansion of the first working fluid drives a flywheel 204 and a crankshaft 220 connected to the Stirling engine and a Stirling cooler 262. The method comprises cooling, by a thermal storage tank 214, a second working fluid within a Stirling cooler 262, and driving the Stirling cooler by the Stirling engine.

The method for operating a Stirling duplex cooler further comprises rotating, by the expansion of the first working fluid, the flywheel 204 by a piston 230 connected to an expansion space 244 of the Stirling engine 260; forcing, by momentum of the flywheel, the first working fluid from the expansion space 244 through a first regenerator 222 and into a compression space 246 of the Stirling engine, cooling, by the first regenerator 222, the first working fluid and further cooling, by a heat sink 354 connected to the compression space of the Stirling engine, the first working fluid.

The method includes translating towards the flywheel, by contraction due to the cooling of the first working fluid, a crankshaft 220 connected to a piston 218 in the compression space of the Stirling engine.

Driving the Stirling cooler 262 comprises translating, by the crankshaft 222, a piston 216 connected to a cooler compression space 234 away from the flywheel 204 and driving, by the translation of the cooler compression space piston 216, a second working fluid into a second regenerator 224. The method continues by cooling the second working fluid by the second regenerator and drawing the second working fluid into a cooler expansion space 238 by driving a piston 228 in the cooler expansion space towards the flywheel, wherein the piston 228 is connected to the flywheel. The method comprises further cooling the second working fluid by rejecting heat into the thermal storage tank 214 by means of a heat sink 240 connected to the cooler expansion space 238.

Operating the Stirling duplex cooler includes producing solar heating by focusing solar radiation by means of a solar concentrator 202. Night-time operation, when there is no solar heating, is ensured by the temperature differential provided at night duplex cooler by using heat stored in the thermal storage tank 214.

The third embodiment is described with respect to FIG. 2A, 3A, 3B, 4A-4E. The third embodiment is drawn to a method for operating a Stirling duplex cooler 200 which comprises directing solar energy, by a solar concentrator 202, onto a Stirling engine expansion surface 244 containing a first working fluid, heating the first working fluid by the solar energy, wherein heating the first working fluid causes the first working fluid to expand and drive a first piston 230 within a first cylinder 206 of the engine expansion space in the direction away from the Stirling engine expansion surface. Operation comprises rotating, by the first piston, a flywheel 204 connected to the first piston in a first direction (shown by arrow, FIG. 2), until the piston 230 pushes the heated first working fluid through a first regenerator 222 into an engine compression space 246, wherein the first regenerator removes heat from the first working fluid. The method continues by filling a second cylinder 210 within the engine compression space with the first working fluid, wherein filling the second cylinder causes a second piston 218 within the second cylinder to translate towards the flywheel and wherein translating the second piston towards the flywheel translates a crankshaft 222 connected to a third piston 216 of a third cylinder 212 of a cooler compression space 234 to push a second working fluid through a second regenerator 224 into a cooler expansion space 228 and moves a fourth piston 228 through a fourth cylinder 208 of the cooler expansion space towards the flywheel, wherein moving the fourth piston towards the flywheel rotates the flywheel in the first direction.

Further cooling the first working fluid entails removing heat from the first working fluid in the engine compression space by means of a first heat sink 354 connected to the second cylinder 310 until the first working fluid contracts and creates a vacuum which moves the second piston away from the flywheel.

Further cooling the second working fluid entails removing heat from the second working fluid in the cooler expansion space 238 by means of a second heat sink 240 connected to the fourth cylinder 208, the second heat sink immersed in a thermal storage tank 214 filled with a water/glycol mixture, until the second working fluid contracts and creates a vacuum which moves the fourth piston away from the flywheel.

Movement of the crankshaft and flywheel momentum continue rotating the flywheel to move the first piston 330 towards the flywheel, wherein moving the first piston towards the flywheel creates a vacuum which draws the first working fluid through the first regenerator 222 where it is warmed and into the first cylinder. The movement also causes the flywheel move the fourth piston 328 away from the flywheel to force the second working fluid through the second regenerator 324 where it is warmed and into the third cylinder.

Operation of the Stirling duplex cooler includes continuing to move the first working fluid in the Stirling engine 260 to drive the second working fluid in the Stirling cooler 262 until the second working fluid reaches a temperature $T_1$ within the cooler expansion space; and using the cooled cylinder as a cooler.

Obviously, numerous modifications and variations of the present invention are possible in light of the above teachings. It is therefore to be understood that within the scope of the appended claims, the invention may be practiced otherwise than as specifically described herein.

The invention claimed is:
1. A Stirling cycle based solar energy powered duplex cooler system, comprising:
   a solar concentrator;
   a Stirling engine;
   a flywheel and crankshaft assembly including a flywheel and a crankshaft;
   a Stirling cooler; and
   a thermal storage tank;
   wherein the Stirling engine, the Stirling cooler and the thermal storage tank are mechanically or conductively connected to the flywheel and crankshaft assembly;
   wherein the Stirling engine includes:
      a first hermetically sealed enclosure containing
         an engine expansion space and an engine compression space;
         a first regenerator having a first end and a second end;
         a first working fluid;
         a first tubing, the first tubing connecting the engine expansion space to the first end of the first regenerator; and
         a second tubing connecting the second end of the first regenerator to the engine compression space;
         a first cylinder and a first piston contained within the engine expansion space, wherein the first piston is configured to move within the engine expansion space when the first working fluid expands;
         a second cylinder and a second piston contained within the engine compression space, wherein the second piston is configured to move within the engine compression space when the first working fluid contracts;
   wherein the solar concentrator is configured to direct solar heat towards the first cylinder and the first piston;
   wherein the Stirling cooler includes:
      a second hermetically sealed enclosure containing
         a Stirling cooler expansion space and a Stirling cooler compression space,
         a second regenerator having a first end and a second end;
         a second working fluid;
         a third tubing, the third tubing connecting the Stirling cooler expansion space to the first end of the second regenerator,
         a fourth tubing connecting the second end of the second regenerator to the Stirling cooler compression space;
         a third cylinder and a third piston contained within the Stirling cooler expansion space, wherein the third piston is configured to move within the Stirling cooler expansion when the second working fluid expands;
         a fourth cylinder and a fourth piston contained within the cooler compression space, wherein the fourth piston is configured to move within the Stirling cooler compression space when the second working fluid contracts; and
   wherein the thermal storage tank is connected to the Stirling cooler expansion space to absorb heat from the cooler expansion space.

2. The Stirling cycle based solar energy powered duplex cooler system of claim 1,
   wherein the first working fluid is one of helium and hydrogen; and
   wherein the second working fluid is one of helium and hydrogen.

3. The Stirling cycle based solar energy powered duplex cooler system of claim 1,
wherein first and second working fluids are helium.

4. The Stirling cycle based solar energy powered duplex cooler system of claim 1, wherein the working fluid in the Stirling engine may be of a different type or at a different average operational pressure than the working fluid in the Stirling cooler.

5. The Stirling cycle based solar energy powered duplex cooler system of claim 1, wherein the solar concentrator is configured to direct a concentrated solar energy at a high temperature, $T_h$, onto an outer surface of the first cylinder.

6. The Stirling cycle based solar energy powered duplex cooler system of claim 5, wherein the solar concentrator includes a parabolic surface having a plurality of Fresnel facets, wherein the Fresnel facets are oriented to focus the solar energy onto the outer surface of the first cylinder.

7. The Stirling cycle based solar energy powered duplex cooler system of claim 1, further comprising:
a heat sink connected to an outer surface of the fourth cylinder, wherein the heat sink is immersed in the thermal storage tank.

8. The Stirling cycle based solar energy powered duplex cooler system of claim 1, wherein the thermal storage tank contains a water-glycol solution.

9. The Stirling cycle based solar energy powered duplex cooler system of claim 1, further comprising a heat sink connected to an outer surface of the second cylinder.

10. The Stirling cycle based solar energy powered duplex cooler system of claim 1,
wherein the first piston and the third piston are operatively connected to the flywheel to rotate the flywheel; and
wherein the second piston and the fourth piston are operatively connected to a crank of the crankshaft for reciprocating motion.

* * * * *